US007617483B2

(12) United States Patent
Vigelius et al.

(10) Patent No.: US 7,617,483 B2
(45) Date of Patent: Nov. 10, 2009

(54) FRAMEWORK FOR MANAGING COMPONENTS

(75) Inventors: Christoph P. Vigelius, Bruchsal (DE); Florian Rehfeld, Heidelberg (DE)

(73) Assignee: SAP AG, Walldorf (DE)

(*) Notice: Subject to any disclaimer, the term of this patent is extended or adjusted under 35 U.S.C. 154(b) by 811 days.

(21) Appl. No.: 11/022,090

(22) Filed: Dec. 21, 2004

(65) Prior Publication Data
US 2006/0136935 A1    Jun. 22, 2006

(51) Int. Cl.
G06F 9/44 (2006.01)
(52) U.S. Cl. .................. 717/121; 717/102; 717/111
(58) Field of Classification Search ......... 717/120–123, 717/100–102, 110–113
See application file for complete search history.

(56) References Cited

U.S. PATENT DOCUMENTS

| 4,943,932 | A | * | 7/1990 | Lark et al. ............... 706/60 |
| 5,724,589 | A | * | 3/1998 | Wold ..................... 717/100 |
| 6,113,649 | A | * | 9/2000 | Govindaraj ............... 717/113 |
| 6,222,537 | B1 | | 4/2001 | Smith et al. |
| 6,550,061 | B1 | * | 4/2003 | Bearden et al. ........... 717/174 |
| 7,234,132 | B2 | * | 6/2007 | Lam ..................... 717/120 |

OTHER PUBLICATIONS

Bott, et al., "Appendix F: Managing Services" of "Microsoft Windows XP Inside Out", Microsoft Press, Redmond, WA, 2003, ISBN 0735618054.*

Wijnstra, Jan, "Supporting Diversity with Component Frameworks as Architectural Elements", ICSE, ACM, 2000, 10 pgs.*
Gamma E., et al., "Design Patterns: Elements of Reusable Object-Oriented Software," Addison-Wesley Professional Computing Series, 1994, pp. 1-31.
Baeg, J., et al., "A Development Strategy of User Navigation Systems and GUI Applications," Computer Software and Applications Conference, COMPSAC 94 Proceedings, 18th Annual International Taipei, Taiwan Nov. 9-11, 1994, pp. 163-168.
European Search Report for corresponding Application No. 05027223.6, dated Mar. 24, 2006.

* cited by examiner

Primary Examiner—Wei Y Zhen
Assistant Examiner—Ryan D Coyer
(74) Attorney, Agent, or Firm—Finnegan, Henderson, Farabow, Garrett & Dunner L.L.P.

(57) ABSTRACT

Methods and apparatus, including computer program products, for a framework for managing software components. The framework uses a framework state model with model state transitions and implements one or more interfaces. Each component implements a respective component state model that is a projection of the framework state model and one or more of the interfaces. Each component implements operations to perform state transitions supported by the component. The framework can use the interfaces to cause components to perform component operations and to provide component state information to the framework. The interfaces define methods usable to determine a current state of a component, determine available state transitions for the current state, and direct the component to perform an available state transition. The available state transitions are one or more of the allowable state transitions that are implemented by the selected component for the current state.

19 Claims, 3 Drawing Sheets

FRAMEWORK FOR MANAGING COMPONENTS

BACKGROUND

The present invention relates to data processing by digital computer, and more particularly to a framework for managing software components.

Software applications are often structured into reusable software components. A software component is a group of software modules, or components, that can be combined with other software components to form a software application. Software components encapsulate functionality and allow an application developer of the software application to use the software component without having to understand its implementation.

SUMMARY OF THE INVENTION

In general, in one aspect, the invention provides methods and apparatus including computer program products implementing techniques for managing software components using a framework. The techniques provide a framework for executing embeddable reusable software components. The framework uses a framework state model and implements one or more interfaces. The framework state model includes multiple model states and multiple model state transitions, where each model state transition is a state transition from a model state to a model state. The techniques provide one or more embeddable reusable components, where each of the components implement a respective component state model that is a projection of the framework state model. Each component further implements one or more of the interfaces, and implements respective operations to perform state transitions supported by the component. The framework is operable to use the interfaces to cause components executing under the control of the framework to perform component operations, and to provide component state information to the framework. The interfaces define methods usable to determine a current state of a specified component, determine which state transitions are available state transitions for the current state for the specified component, and direct the specified component to perform a specified available state transition. The available state transitions are one or more of the allowable state transitions that are implemented by the selected component for the current state. The specified component implements the operations required to be performed in order to achieve the specified available state transition.

Advantageous implementations of the invention include one or more of the following features. The framework state model includes one or more mandatory model states and mandatory model state transitions that must be implemented by each component. The components have a hierarchical relationship. The component has one or more roles, where each component role specifies a subset of the interface that can be used by the framework to manage the component model state. The framework provides a component name service to identify the component implementing a specified component role. The component dynamically publishes at runtime all the available component model state transitions implemented for the current state. The available state transitions published by the component have one or more attributes including a description, an identifier, an icon, a tool-tip, and a position. The specified available state transition is selected by the framework based on user input directed to the specified component.

In another aspect, the invention provides methods and apparatus implementing techniques for receiving input at a framework identifying a component of one or more embeddable reusable software components, where the framework specifies a framework state model and implements one or more framework interfaces. The framework state model includes multiple model states and multiple model state transitions, where each model state transition is a state transition from a model state to a model state. The framework interfaces are operable to manage the components. Each component of the one or more embeddable reusable components implements respective components state model that is a projection of the framework state model. Each component implements one or more of the framework interfaces. The techniques further include determining the current state of the identified component using the framework interface, determining the available state transitions for the current state, and triggering one of the available state transitions based on input received by the framework. The available state transitions are one or more of the model state transitions for the current state that are implemented by the component. The operations required to perform the triggered state transitions are implemented by the component.

The invention can be implemented to realize one or more of the following advantages. The framework provides a predefined user interface for the management of reusable software components. Components implementing a projection of the framework state model and a subset of the framework interfaces can be managed with no knowledge at design time of functions provided by the component or the implementation of the component. Providing a predefined user interface for managing components facilitates the reuse of components in different applications and by different application developers. Components implementing a projection of the framework state mode can use and manage other components implementing a projection of the framework state model with no knowledge of their implementation. A customer receiving the components from a component developer can manage the components with no knowledge of the functions provided by the components or the implementation of the components. The customer can develop new components that implement a projection of the framework state model and manage them using the predefined user interface provided by the framework. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
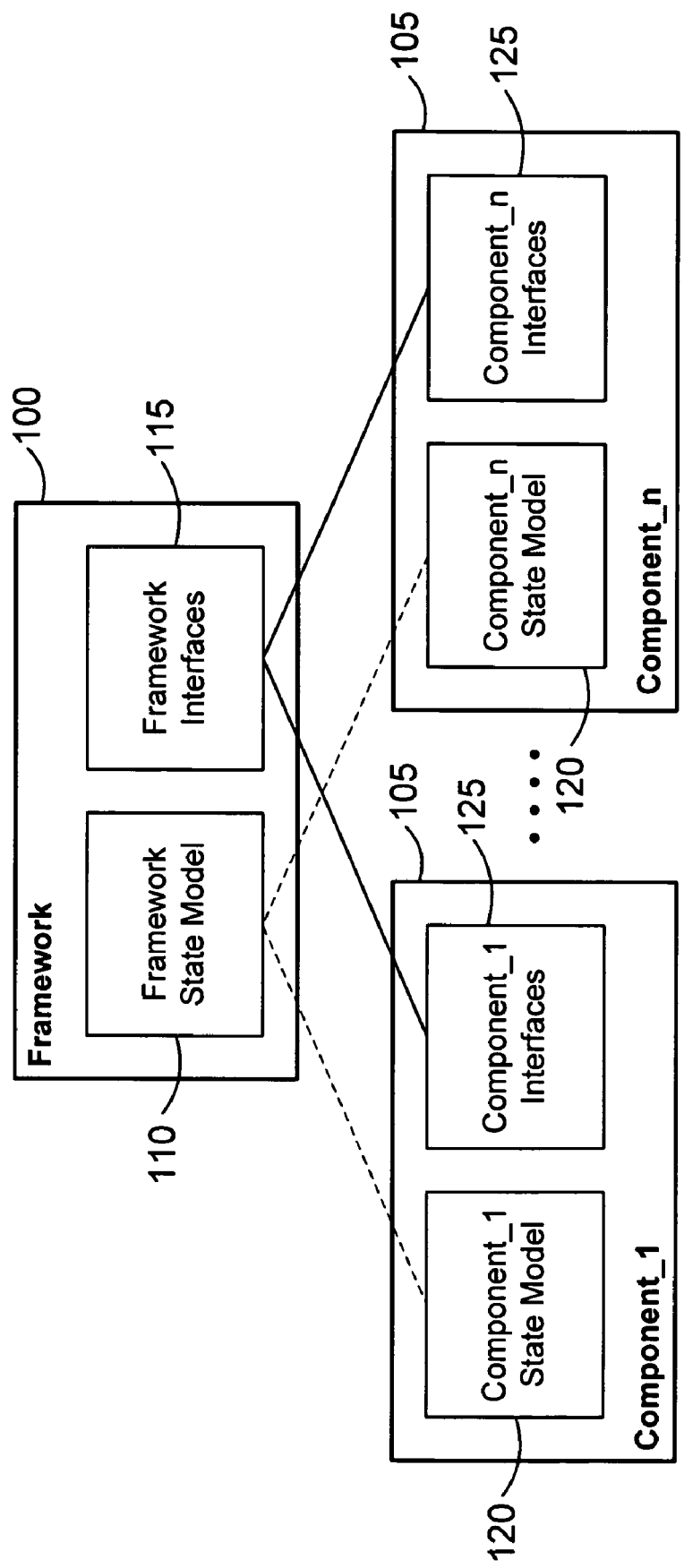
FIG. 1 illustrates a framework for managing embeddable, reusable components.

FIG. 1 illustrates a framework 100 for managing embeddable reusable components 105. The framework uses a framework state model 110 and a set of framework interfaces 115 to interact with the components 105. The framework state model 110 specifies framework model states and framework model state transitions between the states. Each component 105 managed by the framework 100 implements a component state model 120 and a set of component interfaces 125. The component state model 105 is a projection of the framework state model 100, and implements a subset of the framework model states and a subset of the framework model state transitions. In addition, the set of component interfaces 125 is a subset (which need not be proper) of the framework interfaces. The framework can specify mandatory framework model states, mandatory framework model state transitions, and mandatory framework interfaces that must be implemented by each component 120.

The set of component interfaces 125 includes one or more interface functions that are used by the framework to manage the component. The framework uses the component interfaces 125 to cause components to perform state transitions specified by the framework state model and to provide state information to the framework. The component interfaces 125 include interface functions to determine a current state of the component and interface functions to determine the available state transitions for the current state of the component. The available state transitions are the framework model state transitions that the component implements for the current state. The component interfaces 125 also include interface functions to direct the component to perform a specified state transition, where the specified state transition is one of the available state transitions for the current state. The component provides an implementation for all the state transitions in the component state model.

Figure 2:
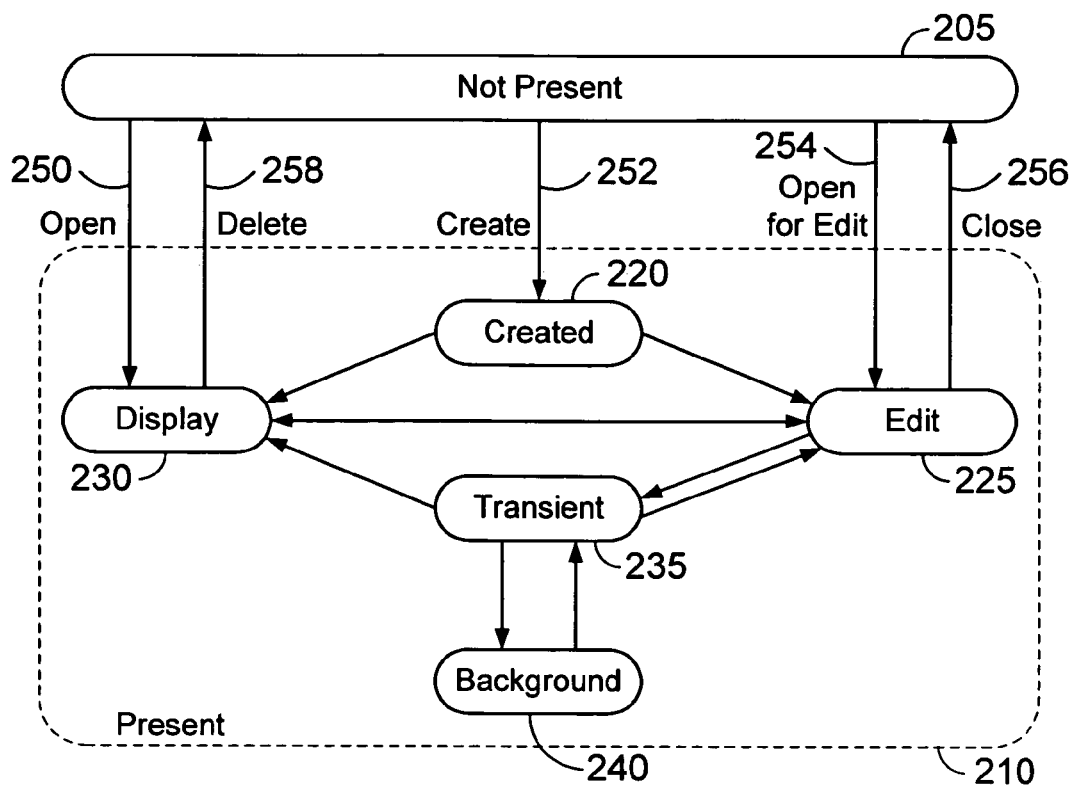
FIG. 2 is an example of a framework state model.

FIG. 2 is an example of a framework state model that includes two states, "Present" 210 and "Not Present" 205. A component is in the "Not Present" state if it has not been loaded by the framework. A component enters the "Present" state after it is loaded by the framework. The framework cannot interact with a component that is in the "Not Present" state. The framework loads a component by either opening the component for display, creating a new component, or opening the component for edit. A component transitions to the "Present" state after it has been loaded by the framework. The framework state model defines three state transitions from the "Not Present" state to the "Present" state—an "Open" transition 250, a "Create" transition 252, and an "Open For Edit" transition 254. A component that is loaded by the framework can be either edited or displayed. The "Open" transition 250 is used to load an existing component without making it available for editing and the "Delete" transition 258 is used to unload a previously loaded component without saving any edits made to the component. The "Open For Edit" transition 254 loads the component and makes it available for editing, and the "Close" transition 256 saves the edits made to the component prior to unloading the component. The "Create" transition 252 creates a new component.

The "Present" state 210 of the framework state model is implemented using a state model 215 that includes five states—"Created" 220, "Edit" 225, "Display" 230, "Transient" 235, and "Background" 240. A component in the "Display" state cannot be modified. A component is in the "Transient" state 235 if it has been modified. A component is in the "Edit" state 225 if it has not been modified, but it can be modified. A component in the "Background" state 240 cannot be displayed or edited even though it has been loaded by the framework. The framework state model can specify mandatory model state transitions that must be implemented by each component state model. Table I is an example of the mandatory state transitions that must be implemented by each component state model.

TABLE I

| Transition Name | From State | To State | Description |
| --- | --- | --- | --- |
| Open | Not Present | Display | Opening the component for display only. The component cannot be modified. |
| Open for Edit | Not Present | Edit | Open the component for editing. |
| Create | Not Present | Create | Create a new component. |
| Cancel | Any State | Not Present | Exit transition that unloads the component. The unloaded component is no longer available for interaction with the framework. |
| Save | Created | Edit | Newly created component available for editing. |
| Toggle | Display | Edit | Toggle between Display and Edit states. |
| Toggle | Edit | Display | Toggle between Display and Edit states. |
| Modify | Edit | Transient | Start modifying component available for editing. |
| Revert | Transient | Display | Cancel edits and revert back to original component. |
| Save | Transient | Edit | Save modifications made to the component. Component is still available for edits. |
| Close | Any State | Not Present | Unload component. |
| Delete | Edit | Not Present | Delete component. |

Figure 3:
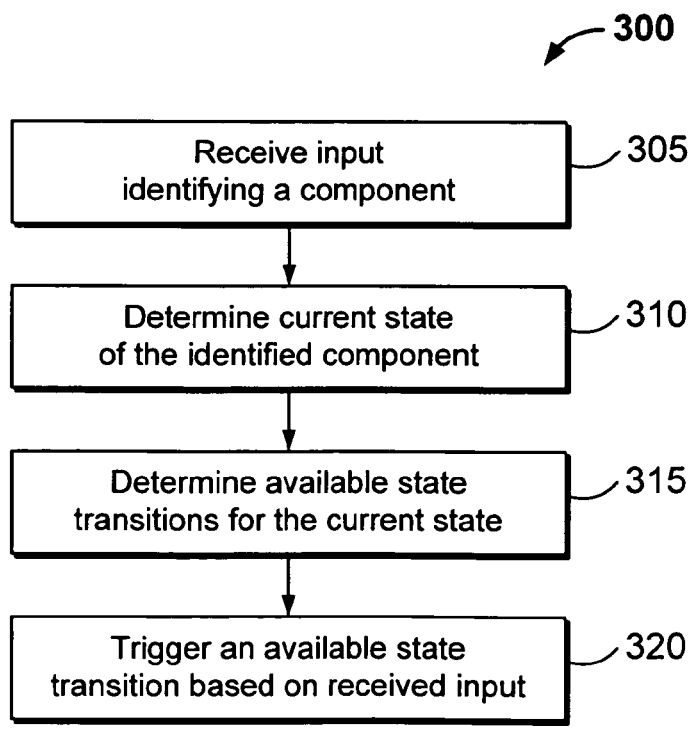
FIG. 3 is a flow diagram illustrating a method for managing components using the framework.

FIG. 3 is a flow diagram illustrating a method 300 for managing components using the framework 100. The framework receives input identifying a component (step 305). The framework determines a current state of the identified component (step 310). The framework uses the component interface to determine the available state transitions for the current state (step 315). The available state transitions are framework model state transitions that are implemented by the component for the current state. The framework triggers one of the available state transitions for the current state based on input received at the framework (step 320). In one implementation, the current state of each component is tracked within the framework, and the framework changes the current state of the component within the framework after triggering the state transition in step 320. In one implementation, the component dynamically publishes all the available state transitions for the current state at runtime. In an alternative implementation, the component dynamically publishes the state transitions by publishing one or more attributes associated with the state transition. The attributes associated with the state transitions include a description of the state transition, an identifier for the state transition, an icon or a tool-tip visually representing the state transition, and a position of the icon or tool-tip that is displayed. The framework can use the published attributes for the available state transitions to provide a visual display of the available state transitions.

A component can have one or more roles, where each role specifies a subset of the component interfaces that can be used by the framework to manage the component model state. For example, a component can have an edit role and a display role, where the edit role includes interface functions required to edit the component but the display role does not include these interface functions. The framework can provide a component name service for identifying a component that implements a specified role.

The framework can provide a visual interface for managing a component using the attributes associated with the state transitions of the component. For example, the component can provide a tool bar that visually displays information regarding the available state transitions for the current state of the component. For each available state transition, the toolbar can include a short description, an identifier, an icon and a tool-tip, and a position of the icon and tool-tip on the toolbar. The toolbar provided by the component can be used by the framework as part of a framework visual interface for managing the components. An embedding component can also provide a visual interface for managing embedded components using the attributes associated with the state transitions of the embedded component. For example, the embedding component can include an embedded component's toolbar as part of the embedding component's visual interface.

Figure 4:
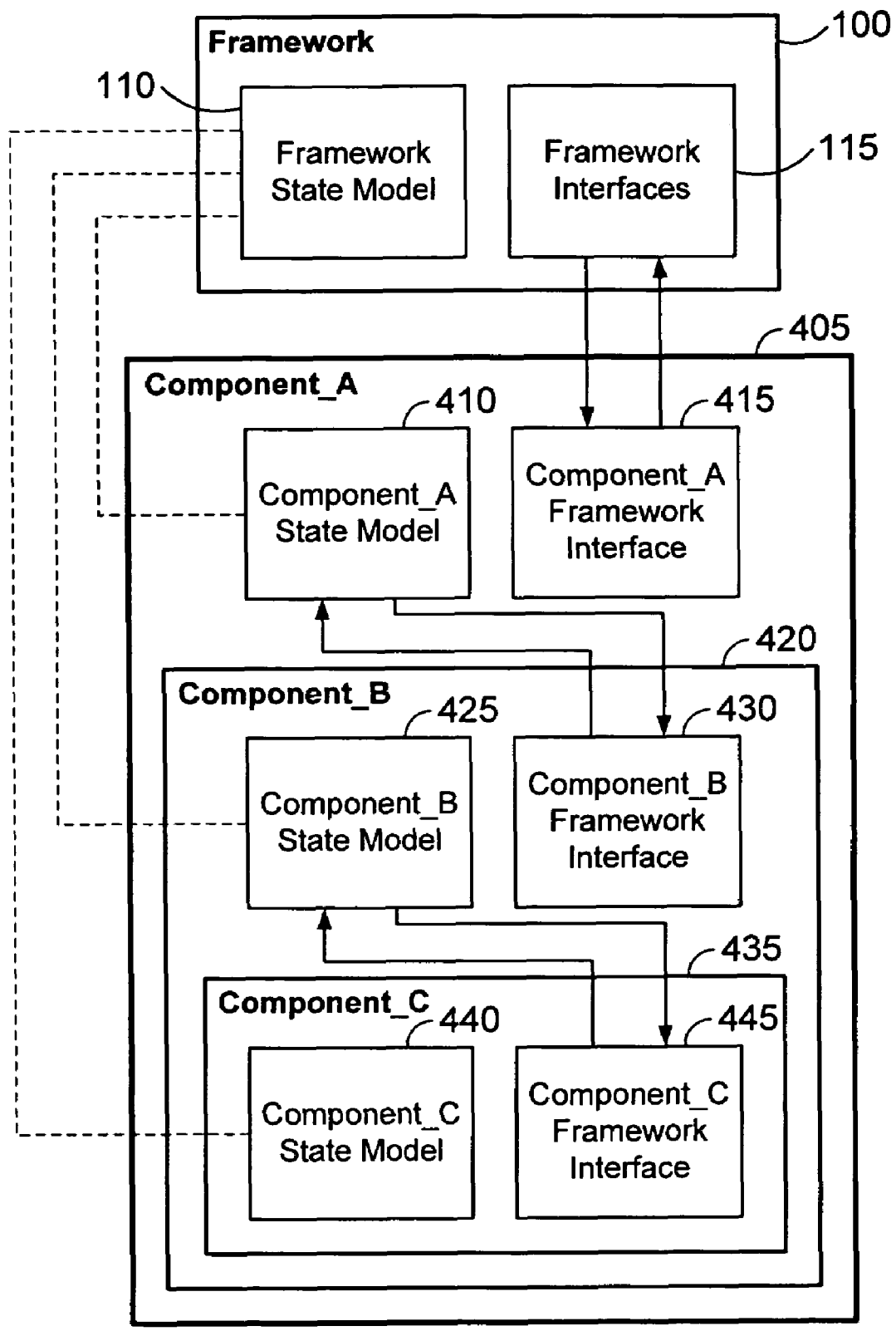
FIG. 4 illustrates using the framework to manage embedded components.

FIG. 4 illustrates using the framework to manage embedded components having a hierarchical relationship. Component_A 405 embeds Component_B 420, and Component_B 420 embeds Component_C 435. Component_A State Model 410, Component_B State Model 425, and Component_C State Model 440 are each a projection of the framework state model 110. In addition, each component implements a subset of the framework interfaces 115 as Component_A framework interface 415, Component_B framework interface 430, and Component_C framework interface 445. The framework can interact with each component directly using the component interface for the component.

An embedding component manages embedded components using the component interfaces of the embedded components. If the implementation of a state transition for Component_A requires a corresponding state transition in Component_B, Component_A directs Component_B to perform the corresponding state transition using the Component_B framework interface. Similarly, Component_B directs Component_C to perform state transitions using the Component_C framework interface. For example, Component_A implements a Delete transition by deleting its own data from a database and triggering a Delete transition for Component_B. Component_B implements the Delete transition by deleting its own data from the database and triggering a Delete transition for Component_C, and Component_C implements the Delete transition by deleting its own data from the database.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in computer-readable storage medium for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention has been described in terms of particular embodiments, but other embodiments can be implemented and are within the scope of the following claims. For example, the operations of the invention can be performed in a different order and still achieve desirable results. Other embodiments are within the scope of the following claims

What is claimed is:

1. A system, comprising:
    a processor;
    a framework for developing software components, the framework using a framework state model and implementing at least one interface, the framework state model including multiple model states and multiple model state transitions, each model state transition being a state transition from a first model state to a second model state, the software components including
    at least one embedding component, wherein the embedding component comprises at least one embedded component, the embedding and embedded components implementing a respective component state model that implements a subset of the framework model states and a subset of the framework model state transitions, the embedding and embedded components further implementing at least one interface, the embedding and embedded components implementing respective operations to perform state transitions supported by the components;
    the embedded and embedding components having at least an edit role and a display role, the edit role specifying a subset of the component interfaces that is used by the framework to update functionality of the component and the display role specifying a subset of the component interfaces that is used by the framework to display the component;

the framework being operable to use the interfaces to cause the embedding and embedded components under control of the framework to perform operations and to provide state information to the framework, the interfaces defining methods to use the processor to:

determine a current state of a specified one of the embedding components, determine which state transitions are available state transitions for the current state for the specified embedding component, the available state transitions being at least one allowable state transition that is implemented by the specified embedding component for the current state, and direct the specified embedding component to perform a specified available state transition and thereby cause the specified embedding component to perform at least one operation implemented by the specified embedding component to achieve the specified available state transition, wherein if the specified state transition requires a corresponding state transition in at least one component embedded in the specified embedding component, the specified embedding component directs the embedded component to perform the corresponding state transition using framework interfaces of the embedded component, wherein when the functionality of the specified embedding component is updated in the edit mode, the specified embedding component performs the specified available transition consistently with the updated functionality.

2. The system of claim 1, wherein the framework state model comprises at least one mandatory model state that must be implemented by the embedding and embedded components.

3. The system of claim 1, wherein the framework state model comprises at least one mandatory state transition that must be implemented by the embedding and embedded components.

4. The system of claim 1, wherein the embedding components and their corresponding embedded components have a hierarchical relationship, and the embedding components manage their corresponding embedded components using the interfaces of the embedded components.

5. The system of claim 1, wherein the framework provides a component name service to identify one of the embedding or embedded components implementing a specified component role.

6. The system of claim 1, wherein the specified embedding component publishes dynamically at runtime all the available component model state transitions implemented for the current state.

7. The system of claim 6, wherein the available state transitions published by the specified embedding component have at least one attribute comprising a description, an identifier, an icon, a tool-tip, and a position.

8. The system of claim 1, wherein the specified available state transition is selected by the framework based on user input directed to the specified embedding component.

9. A method comprising the steps implemented by a computer of:

receiving input at a framework for developing software components, the input identifying an embedding component from the software components, wherein the embedding component comprises at least one embedded component, the framework specifying a framework state model and implementing at least one framework interface to manage the embedding and embedded components, the framework state model including multiple model states and multiple model state transitions, each model state transition being a state transition from a first model state to a second model state, the embedding and embedded components implementing a respective component state model that implements a subset of the framework model states and a subset of the framework model state transitions, the embedding and embedded components implementing at least one framework interface, and the embedded and embedding components having at least an edit role and a display role, the edit role specifying a subset of the component interfaces that is used by the framework to update functionality of the component and the display role specifying a subset of the component interfaces that is used by the framework to display the component;

determining a current state of the embedding component using the framework interface;

determining available state transitions for the current state, the available state transitions being at least one model state transition for the current state that is implemented by the embedding component; and triggering one of the available state transitions based on input received by the framework, wherein the operations required to perform the triggered state transition are implemented by the embedding component, and wherein if the triggered state transition requires a corresponding state transition in the embedded component, the identified embedding component directs the embedded component to perform the corresponding state transition using framework interfaces of the embedded component, wherein when the functionality of the embedding component is updated in the edit mode, the embedding component performs the corresponding state transition consistently with the updated functionality.

10. The method of claim 9, wherein the framework state model comprises at least one mandatory model state that must be implemented by the embedding and embedded components.

11. The method of claim 9, wherein the framework state model comprises at least one mandatory state transition that must be implemented by the embedding and embedded components.

12. The method of claim 9, further comprising:

providing a component name service to identify one of the embedding component or the embedded component that implements a specified component role.

13. A computer program product, tangibly embodied in a computer-readable storage medium, the computer program product being operable to cause a data processing apparatus to perform the operations of:

receiving input at a framework for developing software components, the input identifying an embedding component from the software components, wherein the embedding component comprises at least one embedded component, the framework specifying a framework state model and implementing at least one framework interface to manage the embedding and embedded components, the framework state model including multiple model states and multiple model state transitions, each model state transition being a state transition from a first model state to a second model state, the embedding and embedded components implementing a respective component state model that implements a subset of the framework model states and a subset of the framework model state transitions, the embedding and embedded components implementing at least one framework interface, and the embedded and embedding components having at least an edit role and a display role, the edit role specifying a subset of the component interfaces that is used by the framework to update functionality of the component and the display role specifying a subset of the component interfaces that is used by the framework to display the component;

determining a current state of the embedding component using the framework interface;

determining available state transitions for the current state, the available state transitions being at least one model state transition for the current state that is implemented by the embedding component; and triggering one of the available state transitions based on input received by the framework, wherein the operations required to perform the triggered state transition are implemented by the embedding component, and wherein if the triggered state transition requires a corresponding state transition in the embedded component, the identified embedding component directs the embedded component to perform the corresponding state transition using framework interfaces of the embedded component, wherein when the functionality of the embedding component is undated in the edit mode, the embedding component performs the corresponding state transition consistently with the undated functionality.

14. The product of claim 13, wherein the framework state model comprises at least one mandatory model state that must be implemented by the embedding and embedded components.

15. The product of claim 13, wherein the framework state model comprises at least one mandatory state transition that must be implemented by the embedding and embedded components.

16. The product of claim 13, further comprising instructions operable to cause data processing apparatus to perform the operation of:

providing a component name service to identify one of the embedding component or the embedded component that implements a specified component role.

17. The system of claim 1, wherein program code associated with the specified embedding component is modified in the edit mode to update the functionality of the specified embedding component.

18. The method of claim 9, wherein program code associated with the embedding component is modified in the edit mode to update the functionality of the embedding component.

19. The computer program product of claim 13, wherein program code associated with the embedding component is modified in the edit mode to update the functionality of the embedding component.

* * * * *

UNITED STATES PATENT AND TRADEMARK OFFICE
CERTIFICATE OF CORRECTION

| | | |
|---|---|---|
| PATENT NO. | : 7,617,483 B2 | Page 1 of 1 |
| APPLICATION NO. | : 11/022090 | |
| DATED | : November 10, 2009 | |
| INVENTOR(S) | : Vigelius et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Nineteenth Day of October, 2010

David J. Kappos
*Director of the United States Patent and Trademark Office*